United States Patent
Michel et al.

(10) Patent No.: US 8,371,593 B2
(45) Date of Patent: Feb. 12, 2013

(54) DEVICE FOR ADJUSTING CAMBER AND/OR TOE OF THE WHEELS OF A WHEEL SUSPENSION

(75) Inventors: Wilfried Michel, Riedenburg (DE); Karl-Heinz Meitinger, Muünchen (DE); Christoph Kossira, Ingolstadt (DE); Hugo Müller, Rohrenfels-Ballersdorf (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 13/379,159

(22) PCT Filed: May 29, 2010

(86) PCT No.: PCT/EP2010/003288
§ 371 (c)(1),
(2), (4) Date: Mar. 14, 2012

(87) PCT Pub. No.: WO2010/145752
PCT Pub. Date: Dec. 23, 2010

(65) Prior Publication Data
US 2012/0193882 A1    Aug. 2, 2012

(30) Foreign Application Priority Data

Jun. 19, 2009   (DE) .......................... 10 2009 025 586

(51) Int. Cl.
*B60G 7/02* (2006.01)
(52) U.S. Cl. ................................. 280/86.75; 280/86.751
(58) Field of Classification Search ............... 280/86.75, 280/86.751, 86.758
See application file for complete search history.

(56) References Cited

U.S. PATENT DOCUMENTS

| 6,039,335 A * | 3/2000 | Sheridan ................ 280/124.103 |
| 6,776,426 B2 * | 8/2004 | Deal ........................ 280/86.751 |
| 7,416,264 B2 * | 8/2008 | Tsukasaki .................... 303/189 |
| 7,699,326 B2 * | 4/2010 | Yamada ..................... 280/86.75 |
| 7,914,020 B2 * | 3/2011 | Boston ..................... 280/86.751 |
| 2010/0253026 A1 * | 10/2010 | Michel et al. ............ 280/86.751 |
| 2012/0098221 A1 * | 4/2012 | Michel et al. ............ 280/86.751 |

FOREIGN PATENT DOCUMENTS

| DE | 10 2004 049 296 | 4/2006 |
| DE | 10 2008 011 367 A1 | 4/2009 |
| EP | 1 728 653 A2 | 12/2006 |
| JP | 2007 261555 A | 10/2007 |
| WO | WO 98/16418 A1 | 4/1998 |

* cited by examiner

*Primary Examiner* — Toan To
(74) *Attorney, Agent, or Firm* — Henry M. Feiereisen LLC

(57) ABSTRACT

The invention relates to a device for adjusting the camber and/or toe of the wheels of a wheel suspension, particularly for motor vehicles, having a wheel carrier on which each wheel is rotatably supported and comprising a carrier part receiving the wheel and a guide part connected to the wheel suspension, between which rotating parts (26, 28) rotating about a rotation axis and preferably driven by an electric motor are disposed, bringing about a defined displacement of the carrier part and/or the guide part by the rotational actuation thereof for changing the camber and/or toe. According to the invention, a single adjusting drive (54) is provided for actuating the rotary parts (26, 28), by means of which the two rotary parts (26, 28) can be adjusted in different, particularly in opposite, directions.

14 Claims, 3 Drawing Sheets

DEVICE FOR ADJUSTING CAMBER AND/OR TOE OF THE WHEELS OF A WHEEL SUSPENSION

CROSS-REFERENCES TO RELATED APPLICATIONS

This application is the U.S. National Stage of International Application No. PCT/EP2010/003288, filed May 29, 2010, which designated the United States and has been published as International Publication No. WO 2010/145752 and which claims the priority of German Patent Application, Serial No. 10 2009 025 586.9, filed Jun. 19, 2009, pursuant to 35 U.S.C. 119(a)-(d).

BACKGROUND OF THE INVENTION

The invention relates to a device for adjusting the camber and/or toe of the wheels of a wheel suspension, in particular for motor vehicles.

A wheel suspension of this type is generally known and has a structure wherein the actuating cylinders determining the camber and/or toe are adjusted by way of two actuators and two electric motors in both rotation directions in opposite directions and in the same direction. Only a few angular degrees are usually required to correct the camber and/or the toe for adjusting the rear wheels of wheel suspension, wherein the use of two actuators and two electric motors adds a not insignificant complexity.

It is an object of the invention to propose a device for adjusting camber and/or toe of the wheels of a wheel suspension which can be easily manufactured and controlled.

SUMMARY OF THE INVENTION

According to an aspect of the invention, a device for adjusting camber and/or toe of the wheels of wheel suspensions, in particular for motor vehicles, includes a wheel carrier on which the respective wheel is rotatably supported and which has a carrier part receiving the wheel and a guide part connected with the wheel suspension. Two rotary parts which can be driven by an actuating device and rotated about a rotation axis and forming a type of actuating cylinder are arranged between the guide part and the carrier part, causing a defined displacement of the carrier part and/or the guide part by way of the rotational actuation thereof for changing the camber and/or toe. According to the invention, a single actuator is provided for actuating the rotary parts, by which the two rotary parts can be adjusted in different, particularly in opposite, directions.

The device according to the invention therefore only requires a single actuator and hence has a smaller number of components and a less complex control. The device according to the invention is then more easily produced at lower costs. Although the rotary parts can only be adjusted in opposite directions, they can functionally be rotated in both rotation directions. Particularly advantageously, the wheel rotation axis can be pivoted in a plane rather than in three dimensions; accordingly, instead of a twisting motion, only a pivoting motion occurs in a pivot plane for adjusting the camber and/or the toe of the wheels of wheel suspensions. This plane in which the wheel rotation axis pivots depends on the angular position in which the actuator motor is arranged in the wheel disk in its initial position: for example, either a pure camber adjustment or a pure toe adjustment can be implemented with this arrangement of the actuator motor. Of course, the actuator motor and hence also the pivoting plane may be arranged so as to combine the two effects, i.e., the change in the wheel rotation axis may be accompanied by a simultaneous change of camber and toe.

The actuator is preferably formed by an actuator motor which may be essentially operated, for example, hydraulically or pneumatically. However, particularly preferred is a design with a compact electric motor which can be easily controlled and safety operated.

According to a particularly preferred actual embodiment, it is proposed that the rotary parts can be rotated about a substantially identical rotation axis, wherein the rotary parts may also have slanted surfaces facing one another. These slanted surfaces are arranged with a defined mutual spacing and have each a spur gear, into which a drive gear wheel of an actuator, for example an electric motor, having a drive shaft oriented substantially perpendicular to the rotary axis of the rotation parts protrudes and meshes with both spur gears. The slanted surfaces with the spur gear can be positioned relative to the drive gear wheel of the, for example, electric motor as the actuator in a simple manner, so that with an adjustment in opposite directions either the camber angle or the toe angle or both the camber angle and the toe angle can be intentionally and simultaneously adjusted.

For attaining robust tooth engagements without noticeable play, it is also proposed that the spur gears and the teeth of the drive gear wheel are constructed conical and/or the tooth engagement is implemented as helical gearing.

Moreover, the actuator with its housing may be attached to an extension of the carrier part which is axially parallel to the rotation axis of the rotary parts. The actuator can hence advantageously pivot together with the carrier part during adjusting movements, thereby eliminating complicated compensation devices, such as slide guides and the like.

The carrier part and the guide part of the wheel carrier can each be constructed with two axially parallel and diametrically opposed extensions, which are preferably oriented with a mutual circumferential offset of 90° and on which a support ring is gimbal-mounted with a bearing bolt. Preferably, for a particularly rigid and compact support of the actuating force and actuating torque, the drive shaft of the actuator than passes through the extension and the support ring.

In addition, the drive shaft of the actuator can be rotatably supported in the extension and/or the support ring. In a particularly simple structure, the drive shaft may also form one of the bearing bolts for the support ring.

Lastly, for attaining a stable support commensurate with the requirements for wheel guiding, the rotary parts may be rotatably supported by radially inwardly protruding flange sections on the carrier part and on the stub axles arranged on the guide part, wherein the flange sections engage behind ring shoulders of the stub axles.

BRIEF DESCRIPTION OF THE DRAWING

An exemplary embodiment of the invention will now be described in more detail. The schematic drawing shows in.

DETAILED DESCRIPTION OF PREFERRED EMBODIMENTS

Figure 1:
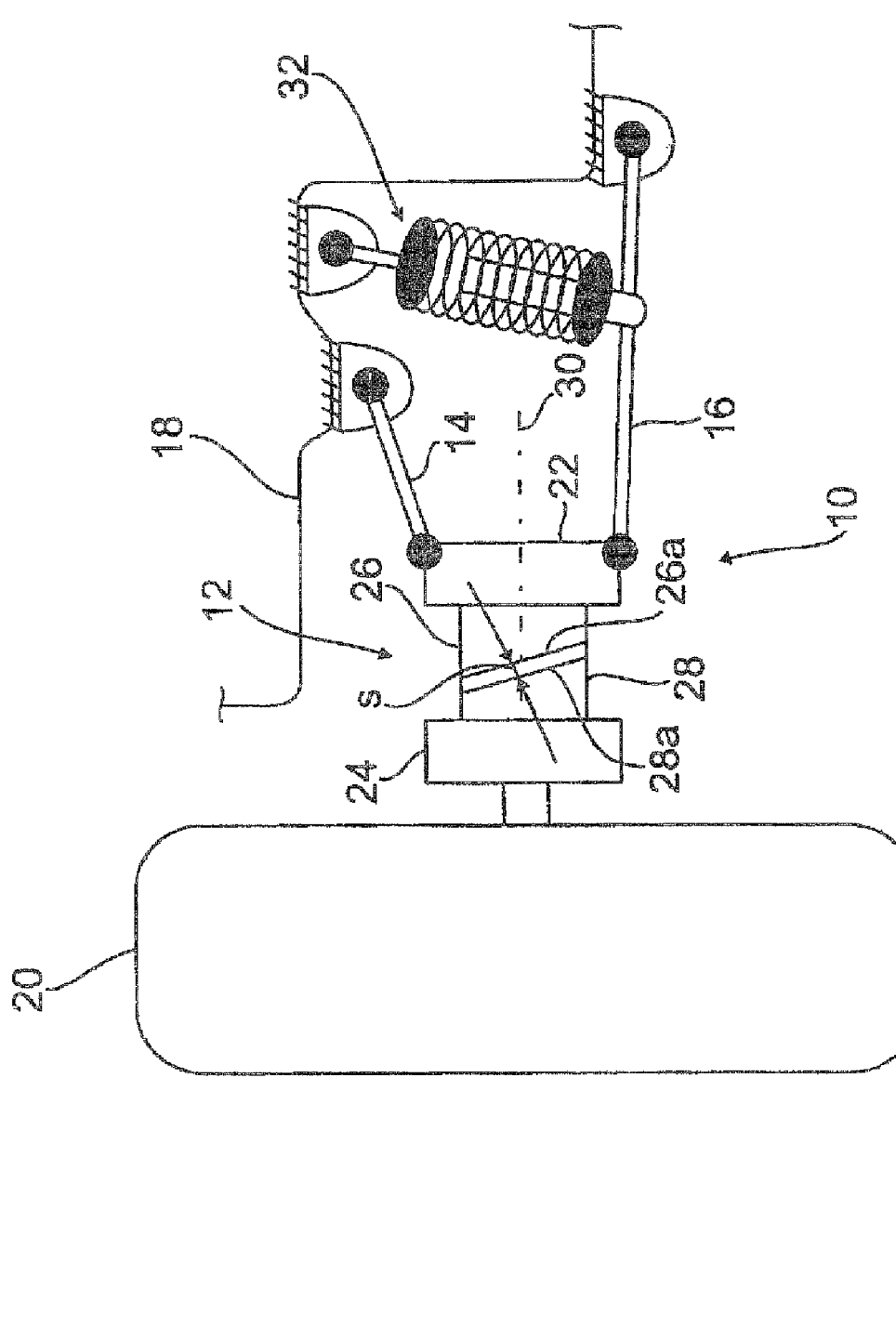
FIG. 1 a wheel suspension for motor vehicles with a multi-part wheel carrier attached on wheel guiding elements, wherein the wheel of the wheel carrier is adjustable by way of two rotatable rotary parts, wherein the rotary parts can be rotated in opposite directions by an actuator depicted in FIGS. 2 and 3, FIG. 2 the wheel carrier according to FIG. 1 with rotary parts having spur gears, which can be rotated in opposite directions by a drive pinion with an electric motor arranged perpendicular to the rotation axis of the rotary parts, and FIG. 3 a longitudinal cross-sectional view taken along the line of FIG. 2 through the wheel carrier.

FIG. 1 shows in a simplified schematic diagram a rear wheel suspension 10 for motor vehicles, wherein a wheel carrier 12 is attached with transverse control arms 14, 16 as wheel guiding elements to a body 18 which is only partially depicted.

The wheel carrier 12 which rotatably receives the wheel 20 is divided into a guide part 22 attached on the transverse control arms 14, 16, a carrier part 24 receiving the wheel 20 via a corresponding wheel bearing (not shown), and two rotary parts 26, 28 supported on the guide part 22 and on the carrier part 24 for rotation about a common rotation axis 30.

The two rotary parts 26, 28 have opposing slanted surfaces 26a, 28a which are inclined with respect to the rotation axis 30, with the slanted surfaces 26a, 28a cooperating in a manner to be described below and causing the carrier part 24 carrying the wheel 22 to tilt when the rotary parts 26, 28 rotate in opposite directions, and causing a respective adjustment of the camber and/or the toe of the wheel 20.

The wheel load of the wheel suspension 10 is supported in a conventional manner against the body 18 by a bearing spring or a spring strut 32.

Figure 2:
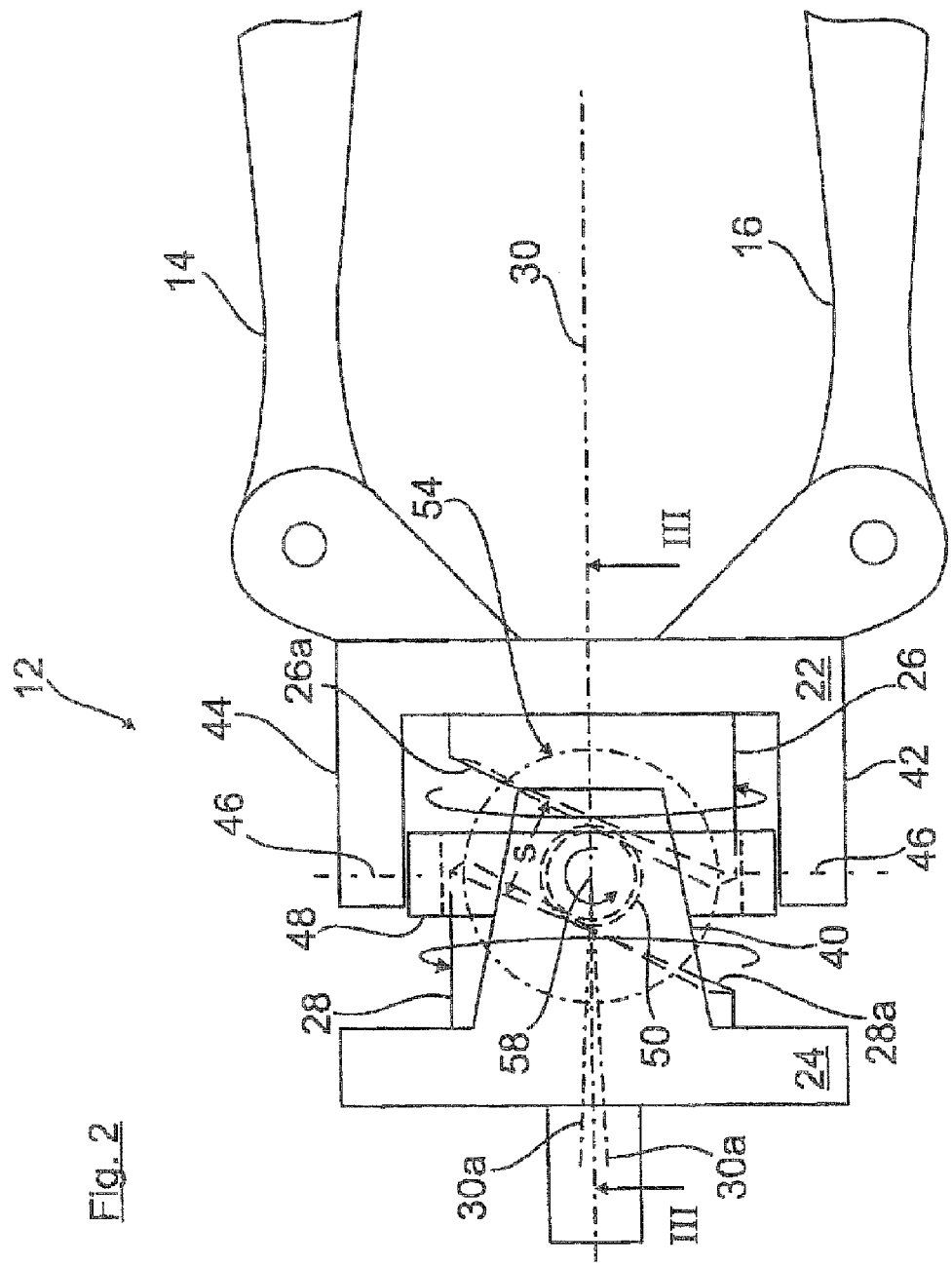
Figure 3:
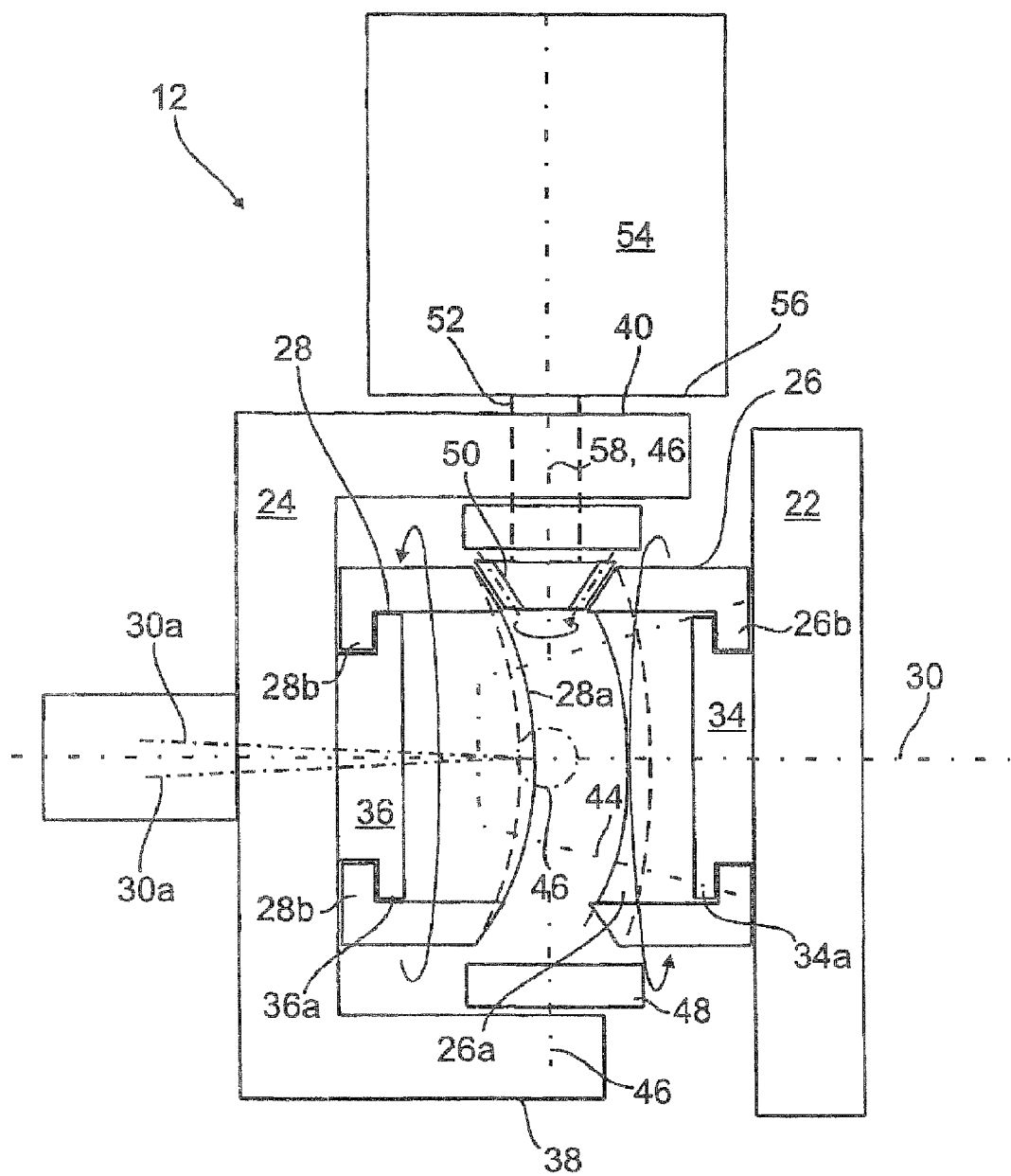

The rotary parts 26, 28 (see FIGS. 2 and 3) are rotatably supported on stub axles 34, 36, wherein a corresponding radially inwardly protruding flange section 26b, 28b of the rotary parts 26, 28 formfittingly engages behind a ring shoulder 34a, 36a having a large diameter. The stub axles 34, 36 are each rigidly connected with the guide part 22 and the carrier part 24, for example by a screw connection.

The guide part 22 and the carrier part 24 are also connected by a gimbal joint for articulation.

For this purpose, axially parallel, diametrically opposed forked extensions 42, 44 (on the guide part 22) and 38, 40 (on the carrier part 24), respectively, facing each other are provided on the guide part 22 and on the carrier part 24, which are connected with a gimbal ring or a support ring 48 by way of bearing bolts 46 (indicated only by a dotted line) for articulation.

The carrier part 24 is gimbal-mounted on the guide part 22 by the extensions 38, 40 and 42, 44, respectively, which are circumferentially offset by 90°, and the support ring 48, wherein the rotary parts 26, 28 are arranged so as to provide a defined spacing s between the slanted surfaces 26a, 28a.

The aforementioned slanted surfaces 26a, 28a each have a conical spur gear toothing and drivingly cooperate with a drive pinion 50 which protrudes into the aforementioned spacing s between the rotary parts 26, 28.

The drive pinion 50 is attached on a drive shaft 52 of an actuator constructed here as an electric motor 54, wherein a housing 56 of the electric motor 54 is preferably attached to the extension 40 of the carrier part 24. The rotation axis 58 of the driveshaft 52 of the electric motor 54 is hereby oriented perpendicular to the rotation axis 30 of the rotary parts 26, 28 and is located, as seen from the illustration, in a common center plane with the bearing bolts 46 for the support ring 48.

The driveshaft 52 carrying the drive pinion 50 (see FIG. 3) of the electric motor 54 also passes through the extension 40 of the carrier part 24 and through the support ring 48 and is rotatably supported therein, wherein the driveshaft 52 simultaneously performs a double function as the bearing bolt 46 as a pivot support of the support ring 48.

When the two rotary parts 26, 28 are rotated by the electric motor 54 in opposite directions in one or the other rotation direction, the carrier part 24 carrying the wheel 20 is tilted, thereby pivoting its wheel rotation axis 30a and hence the angular position of the wheel 20 for adjustment of the camber and/or toe commensurate with the respective position of the inclined planes spanned by the end faces 26a, 28a of the rotary parts 26, 28. In other words, the bending axis about which the wheel rotation axis 30a pivots does not depend on the arrangement of the of the gimbal joint, but only on the position of the aforedescribed inclined planes of the rotary parts 26, 28 in three dimensions. The spatial arrangement of the gimbal joint is hereby unimportant. The electric motor 54 attached on the carrier part 24 or on its extension 40 is pivoted commensurately.

The spur gear toothing on the end faces 26a, 28a of the rotary parts 26, 28 and the drive pinion 50 are preferably helically geared for increasing the tooth overlap of the actuator.

The invention claimed is:

1. A device for adjusting camber and/or toe of wheels of a wheel suspension, in particular for motor vehicles, comprising:
   a wheel carrier supporting a wheel for rotation, wherein the wheel carrier comprises a carrier part receiving the wheel and a guide part connected with the wheel suspension,
   two rotary parts which have inclined slanted surfaces facing each other with a defined mutual spacing and each having a spur toothing, wherein the two rotary parts can be operated with an actuating device and rotated about a rotation axis arranged between the carrier part and the guide part, wherein the two rotary parts cause a defined displacement of at least one of the carrier part and the guide part for changing camber and/or toe,
   a single actuator having a drive pinion protruding into the defined spacing between the slanted surfaces and engaging with the spur toothing of the two rotary parts for operating the rotary parts and simultaneously adjusting the two rotary parts in different directions.

2. The device of claim 1, wherein the different directions are opposing directions.

3. The device of claim 1, wherein the actuator is formed by an actuator motor.

4. The device of claim 3, wherein the actuator motor is an electric motor.

5. The device of claim 1, wherein the actuator comprises a driveshaft carrying the drive pinion, with the driveshaft being oriented substantially perpendicular to the rotation axis of the two rotary parts.

6. The device of claim 1, wherein the spur toothing of the two rotary parts and the toothing of the drive pinion are conical.

7. The device of claim 1, wherein the spur toothing of the two rotary parts and the toothing of the drive pinion are implemented as helical gearing.

8. The device of claim 1, wherein a housing of the actuator is attached on an extension of the carrier part which is oriented axially parallel with respect to the rotation axis of the two rotary parts.

9. The device of claim 8, wherein the carrier part and the guide part of the wheel carrier each comprise two axially parallel and diametrically opposed extensions which are oriented towards each other with a circumferential offset, and wherein a support ring is gimbal-mounted on the extensions with bearing bolts.

10. The device of claim 9, wherein the circumferential offset is 90°.

11. The device of claim 9, wherein the actuator comprises a driveshaft carrying the drive pinion, and wherein the driveshaft passes through at least one of an extension and a support ring.

12. The device of claim 11, wherein the driveshaft is rotatably supported in at least one of an extension and a support ring.

13. The device of claim 11, wherein the driveshaft also forms one of the bearing bolts for the support ring.

14. The device of claim 1, wherein the guide part comprises stub axles having ring shoulders, and wherein the two rotary parts are rotatably supported on the carrier part and on the stub axles on the guide part by way of radially inwardly projecting flange sections, wherein the flange sections engage behind the ring shoulders having a larger diameter than the flange sections.

* * * * *